US008151586B2

(12) United States Patent
Sato et al.

(10) Patent No.: US 8,151,586 B2
(45) Date of Patent: Apr. 10, 2012

(54) HOT WATER SUPPLY AND AIR CONDITIONING SYSTEM USING $CO_2$ HEAT PUMP

(75) Inventors: Kazuyoshi Sato, Sendai (JP); Youichi Kawazu, Higashihiroshima (JP); Tooru Saitou, Higashihiroshima (JP)

(73) Assignee: Mayekawa Mfg. Co., Ltd. (JP)

( * ) Notice: Subject to any disclaimer, the term of this patent is extended or adjusted under 35 U.S.C. 154(b) by 711 days.

(21) Appl. No.: 11/719,480

(22) PCT Filed: Nov. 21, 2005

(86) PCT No.: PCT/JP2005/021749
§ 371 (c)(1),
(2), (4) Date: Jul. 2, 2007

(87) PCT Pub. No.: WO2006/054804
PCT Pub. Date: May 26, 2006

(65) Prior Publication Data
US 2009/0145149 A1 Jun. 11, 2009

Related U.S. Application Data

(60) Provisional application No. 60/629,311, filed on Nov. 19, 2004.

(51) Int. Cl.
*F25B 27/00* (2006.01)
(52) U.S. Cl. ....... 62/238.7; 62/238.6; 62/434; 62/238.4; 62/324.1
(58) Field of Classification Search ............... 62/238.6, 62/238.7, 434, 238.4, 324.1
See application file for complete search history.

(56) References Cited

U.S. PATENT DOCUMENTS
4,012,920 A * 3/1977 Kirschbaum ........... 62/235.1
(Continued)

FOREIGN PATENT DOCUMENTS
| DE | 20216324 U1 | 3/2003 |
| FR | 2451558 A | 10/1980 |
| JP | 2003-194433 A | 7/2003 |

OTHER PUBLICATIONS

Machine translation of Izumi JP Publication No. 2003-050050.*

(Continued)

*Primary Examiner* — Cheryl J Tyler
*Assistant Examiner* — Jonathan Koagel
(74) *Attorney, Agent, or Firm* — Rossi, Kimms & McDowell LLP (57) ABSTRACT

To realize a $CO_2$ heat pump system in which reduction in coefficient of performance of heat pump cycle is prevented by maintaining the temperature of the water supplied to the gas cooler of the $CO_2$ heat pump below a certain temperature and raising heat source side temperature in the evaporator, and which has functions to supply a heat source not only to hot water supplying equipment but also to supply a heat source or coolness source to air conditioning equipment or others, the system comprises a low temperature water tank 6, a high temperature water tank 9 for storing high temperature water heated in a gas cooler 3, piping 10, 12 for supplying the high temperature water to hot water supplying equipment and room heating equipment respectively, a first heat exchanger 21 in which brine (water) for supplying latent heat of vaporization of $CO_2$ refrigerant to the refrigerant in the evaporator 5 exchanges heat with heat giving fluid (fluid from which heat is withdrawn), a second heat exchanger located upstream of the first heat exchanger to cool the high temperature water after it is used as a heat source for the room heating equipment (therefore the temperature is already not so high) by heat exchange with the heat receiving fluid, piping for introducing the water cooled in the second heat exchanger to the low temperature water tank 6, and a low temperature water supply means 7.

6 Claims, 7 Drawing Sheets

U.S. PATENT DOCUMENTS

| | | | |
|---|---|---|---|
| 4,257,239 A * | 3/1981 | Partin et al. | 62/238.7 |
| 5,088,646 A * | 2/1992 | Yamagishi et al. | 237/2 B |
| 5,727,396 A | 3/1998 | Boyd et al. | |
| 6,405,551 B1 * | 6/2002 | Kuwabara et al. | 62/238.7 |
| 7,260,940 B2 * | 8/2007 | Watanabe et al. | 62/4 |

OTHER PUBLICATIONS

Relevant Portion of International Search Report issued in the corresponding International Application No. PCT/JP2005/021749, with mailing date Mar. 3, 2006.

* cited by examiner

//HOT WATER SUPPLY AND AIR CONDITIONING SYSTEM USING $CO_2$ HEAT PUMP

This is a U.S. National Phase Application of PCT International Application PCT/JP05/21749 filed on Nov. 21, 2005 which is based on and claims priority from U.S. Ser. No. 60/629,311 filed on Nov. 19, 2004.

TECHNICAL FIELD

The present invention relates to a heat supply and air conditioning system using a heat pump capable of supplying a heat source to hot water supplying equipment and air conditioning equipment for heating-cooling rooms concurrently independently or selectively by using a very efficient heat pump using $CO_2$ refrigerant with which coefficient of performance (COP) can be maintained at high level.

BACKGROUND ART

Generally, a refrigerating cycle or heat pump cycle using $CO_2$ as a refrigerant is composed by connecting a compressor, gas cooler, pressure reducing device, and evaporator.

The gas cooler is a heat waster in the cycle in which, for example, water is heated and supplied as hot water. $CO_2$ refrigerant has zero ozone depleting coefficient and its greenhouse effect index is 1, so it has advantages that it is environment-friendly, non-toxic, non-flammable, safe and cheap. A heat pump cycle using $CO_2$ refrigerant is superior in efficiency in supplying hot water.

However, when the temperature of the water supplied to the gas cooler rises, the coefficient of performance (COP) of the cycle decreases.

A means to solve this problem is disclosed in patent literature 1 (JP-A-2003-194433). According to the means disclosed in patent literature 1, a heat exchanger is provided parallel to the open/close valve provided between the gas cooler and expansion valve, a temperature sensor is provided at the entrance of water of the gas cooler, and the open/close valve is closed when the temperature detected by the temperature sensor rises higher than a prescribed temperature. The heat exchanger is united with the evaporator in one or disposed separately and utilizes the latent heat of vaporization of the refrigerant in the evaporator to cool the refrigerant flowed out from the gas cooler.

When the open/close valve is closed, the refrigerant flowing out from the gas cooler bypasses through the open/close valve and flows into the heat exchanger provided parallel to the open/close valve, the refrigerant is cooled there, and the refrigerant fallen in temperature is introduced to the expansion valve to be expanded and introduced into the evaporator.

In the means disclosed in patent literature 1, as mentioned above, a heat exchanger is provided in order to lower the outlet side refrigerant temperature when the temperature of the water supplied to the gas cooler has risen higher than a prescribed temperature, that is, the refrigerant flowing out from the gas cooler is cooled by heat exchange within the $CO_2$ heat pump cycle. By this method, the heat of the refrigerant flowing out from the gas cooler is dissipated uselessly to outside without utilizing the heat effectively. Further, this method can be applied only to a hot water supply system using a heat pump, and application is restricted.

On the other hand, due to the characteristics of the $CO_2$ refrigerant, in the case the hot water heated in the gas cooler is used for a heat source to other equipment for room heating, etc. and the water returned from the other equipment is introduced to the gas cooler as cooling water, the returned water is rather high in temperature and coefficient of performance (COP) of the heat pump decreases.

DISCLOSURE OF INVENTION

The object of the present invention is made in light of the problems mentioned above, and aims to realize a system which has functions not only of supplying a heat source to hot water supplying equipment but also of supplying a heat source or coolness source to air conditioning equipment or other equipment while maintaining high coefficient of performance of the heat pump, by keeping the temperature of water supplied to the gas cooler as cooling water below a certain temperature and raising heat source side temperature in the evaporator by utilizing the heat of river water, etc. and/or the heat of the water after it is used for heating equipment, not by cooling the temperature of refrigerant after it flows out from the gas cooler.

To attain the object, the present invention proposes a hot water supply and air conditioning system using $CO_2$ heat pump including a compressor, gas cooler, pressure reducing device, and an evaporator connected in sequence for supplying a heat source to a hot water supplying equipment and air conditioning equipment through independent pipe lines, comprising;

a low temperature water tank for storing low temperature water, a high temperature water tank for storing high temperature water heated in said gas cooler, piping for feeding the high temperature water stored in said high temperature water tank to said hot water supplying equipment and a room heating equipment as a heat source, a first heat exchanger in which brine (water) for supplying latent heat of vaporization of $CO_2$ refrigerant to the refrigerant in said evaporator exchanges heat with heat giving fluid (fluid from which heat is withdrawn), a second heat exchanger located upstream of said first heat exchanger to cool said high temperature water after it is used as a heat source for said room heating equipment (therefore the temperature is already not so high) by heat exchange with said heat receiving fluid, piping for introducing the water cooled in said second heat exchanger to said low temperature water tank, and a water supply means for supplying low temperature water to said low temperature water tank;

whereby low temperature water is fed from said low temperature water tank to said gas cooler to be heated to a temperature equal to or higher than 60° C. to be supplied by way of said high temperature water tank as a heat source for said hot water supplying equipment and room heating equipment.

In the invention, low temperature water of below ordinary temperature stored in the low temperature water tank is introduced to the gas cooler of the $CO_2$ heat pump to be heated therein to 60° C. or higher to be stored in the high temperature tank. Here, low temperature water means water of 25° C. or lower. In the low temperature tank is always stored low temperature water, by supplying the low temperature water to the gas cooler, coefficient of performance of the heat pump is prevented from decreasing.

By supplying the high temperature water stored in the high temperature water tank to the hot water supplying equipment as a heat source, hot water supply is possible. In the case of hot water supplying, the hot water is not returned to the system, so a means to supply water to the low temperature water tank is provided.

The system of the invention is composed to supply the high temperature water to room heating equipment through a separate passage independently from that for the hot water supplying equipment in order to supply a heat source to the room heating equipment. Further, heat found in nature is utilized in such a way that the brine (water) for supplying latent heat of vaporization of $CO_2$ refrigerant to the refrigerant in the evaporator of the $CO_2$ heat pump is allowed to exchange heat with the heat giving fluid in the first heat exchanger to be raised in temperature, that is, the heat source side temperature in the evaporator can be raised by utilizing heat found in nature. When the high temperature water is supplied to room heating apparatus, the heat giving fluid can be raised in temperature in the second heat exchanger while the warm water returning from the room heating equipment is cooled by the heat giving fluid in the second heat exchanger and returned to the low temperature water tank.

By raising heat source side temperature of the evaporator of the heat pump by supplying from the heat giving fluid the latent heat of vaporization of the refrigerant to evaporate it in this way, coefficient of performance of the heat pump can be increased. As heat giving fluid, water heat source such as river water, sewage water, waste water, etc. or air heat source such as outside air, etc. can be used, and heat of these heat sources is withdrawn by brine (water) and supplied to the evaporator. By this, the heat pump can be prevented from decreasing in heating capacity.

When high temperature water is used as a heat source for room heating equipment, it can be returned to the system unlike the case it is used as a heat source for hot water supplying equipment, so low temperature water is not supplied, instead the high temperature water is cooled by the second heat exchanger to be returned to the low temperature water tank, and at the same time the heat of heat giving fluid is utilized for raising the heat source side temperature of the evaporator.

In the invention, it is preferable that the system is composed such that the high temperature water to be used as the heat source for the room heating equipment flows sequentially first to be used as the heat source for the space heating equipment and then to be used as the heat source for the floor heating equipment, and the water after it is used for the floor heating equipment is cooled in the second heat exchanger to be returned to the low temperature water tank.

By composing like this, the high temperature water dissipates its heat for the space heating equipment and then it is introduced to the floor heating equipment, so that the high temperature water decreased in temperature can be introduced to the floor heating equipment at an appropriate temperature for the floor heating equipment. In this way, the high temperature water is introduced to the space cooling equipment and floor heating equipment at temperatures appropriate respectively for both the equipments effectively and then cooled below ordinary temperature to be returned to the low temperature water tank.

In the invention, it is preferable that piping is provided for supplying the low temperature water stored in the low temperature water tank to cooling equipment as a cooling agent.

It is also preferable that the system is composed such that said high temperature water tank and low temperature water tank is communicated by a passage capable of being opened or closed, and both the tanks are communicated by opening said passage when performing nighttime operation to store high temperature water so that the high temperature water is stored in both of said low temperature water tank and high temperature water tank.

It is preferable that the system is composed such that; piping for allowing said high temperature water to flow to be used as the heat source for said space heating equipment, floor heating equipment, and snow melting equipment sequentially, and piping for introducing the water after it is used as the heat source for said snow melting equipment into said low temperature water tank are provided, whereby said high temperature water dissipates heat to be reduced in temperature in the room heating equipment side including the space heating and floor heating equipment or only in the space heating equipment side and then further dissipates heat in the snow melting equipment side to be reduced in temperature below ordinary temperature to be returned to said low temperature water tank.

By composing like this to allow the high temperature water to flow through the space heating equipment, floor heating equipment, and snow melting equipment sequentially to dissipate heat in each of the equipments sequentially, high temperature water of appropriate temperature for each of the equipments respectively can be supplied. By allowing the high temperature water to flow through the snow melting equipment in the last place, the water decreased in temperature flowing out from the snow melting equipment can be introduced to the low temperature tank directly without necessity of cooling it in the second heat exchanger as mentioned above. In this way, the heat of the high temperature water can be effectively utilized for a wide range of use without inducing occurrence of decrease in coefficient of performance of the heat pump.

According to the hot water supply and air conditioning system of the invention, by composing the system such that it comprises; a low temperature water tank for storing low temperature water, a high temperature water tank for storing high temperature water heated in said gas cooler, piping for feeding the high temperature water stored in said high temperature water tank to said hot water supplying equipment and a room heating equipment as a heat source, a first heat exchanger in which brine (water) for supplying latent heat of vaporization of $CO_2$ refrigerant to the refrigerant in said evaporator exchanges heat with heat giving fluid (fluid from which heat is withdrawn), a second heat exchanger located upstream of said first heat exchanger to cool said high temperature water after it is used as a heat source for said room heating equipment (therefore the temperature is already not so high) by heat exchange with said heat receiving fluid, piping for introducing the water cooled in said second heat exchanger to said low temperature water tank, and a water supply means for supplying low temperature water to said low temperature water tank; whereby low temperature water is fed from said low temperature water tank to said gas cooler to be heated to a temperature equal to or higher than 60° C. and supplied by way of said high temperature water tank as a heat source for said hot water supplying equipment and room heating equipment, low temperature water can be supplied to the gas cooler, and the heating source side temperature of the evaporator can be raised by means of the first heat exchanger by utilizing the heat of heat giving fluid of outside of the system to supply latent heat of vaporization of $CO_2$ refrigerant to the refrigerant in the evaporator, as a result coefficient of performance of the heat pump can be maintained high.

Further, by composing the system such that, when supplying heat source to room heating equipment, the high temperature water supplied to the room heating equipment is cooled in the second heat exchanger to be returned to the low temperature water tank and further the heat of heat giving fluid (fluid from which heat is withdrawn) is allowed to be utilized by means of the first heat exchanger to raise the heat source side temperature of the evaporator, the water supplied to the gas cooler can be maintained low in temperature and the heat of heat giving fluid outside the system is utilized effectively to maintain high coefficient of performance without occurrence of decrease in the operating capacity of the heat pump.

Further, by preferably providing piping for supplying the low temperature water stored in the low temperature tank to cooling equipment, the low temperature water can be used as cooling medium for the cooling equipment, thus not only heat supplying to hot water supplying equipment but also heat supplying and/or coolness supplying to air conditioning equipment are possible at the same time.

Further, by providing a pipe passage communicating the high temperature water tank and low temperature water tank so that the passage can be opened or closed, a circulation line is formed in which water flows from the low temperature water tank through the gas cooler and high temperature water tank to return to the low temperature water tank in order to store high temperature water in both the high temperature water tank and low temperature water tank. By this, nighttime continuous operation can be possible to increase the storage amount of hot water.

Further, by composing the system preferably such that piping for allowing the high temperature water to flow to be used as the heat source for said space heating equipment, floor heating equipment, and snow melting equipment sequentially, and piping is provided for introducing the water after it is used as the heat source for the snow melting equipment into the low temperature water tank, whereby the high temperature water dissipates heat to be decreased in temperature in the room heating equipment side including the space heating and floor heating equipment or only in the space heating equipment side and then further dissipates heat in the snow melting equipment side to be decreased in temperature below ordinary temperature to be returned to the low temperature water tank, the hot water is allowed to dissipate heat for the space cooling, floor cooling, and snow melting sequentially, and as a result hot or warm water of temperature appropriate for each of the equipments respectively can be supplied.

In this case, it is not necessary to cool the hot water in the second heat exchanger, the heat of the hot water can be effectively utilized for a wide range of use without inducing occurrence of decrease in coefficient of performance of the heat pump.

BEST MODE FOR CARRYING OUT THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
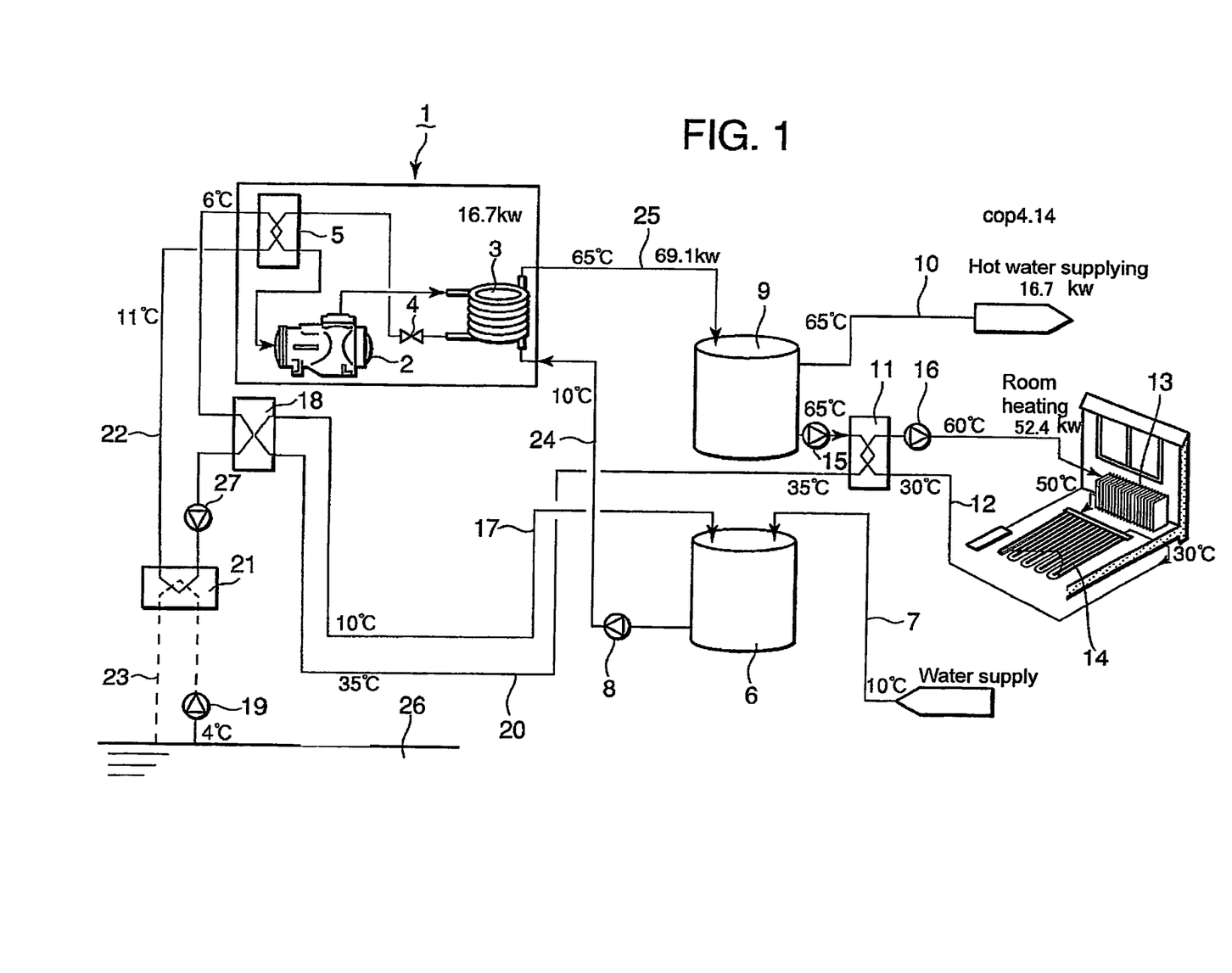
FIG. 1 is an overall system diagram of the first embodiment according to the present invention.
Figure 4:
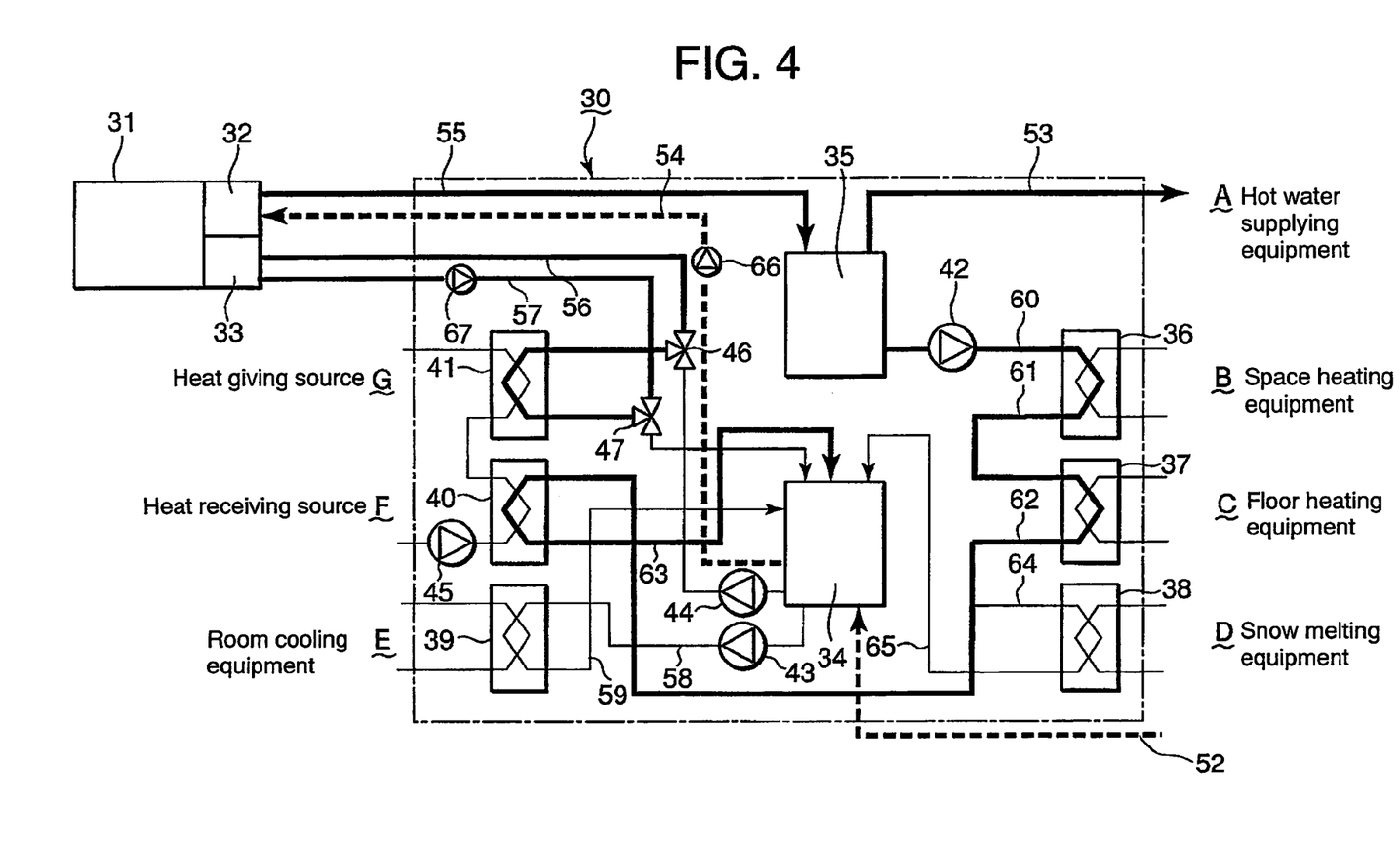
FIG. 4 is an overall system diagram of the second embodiment of the present invention in the case of hot water supplying, space heating, and floor heating in winter.
Figure 5:
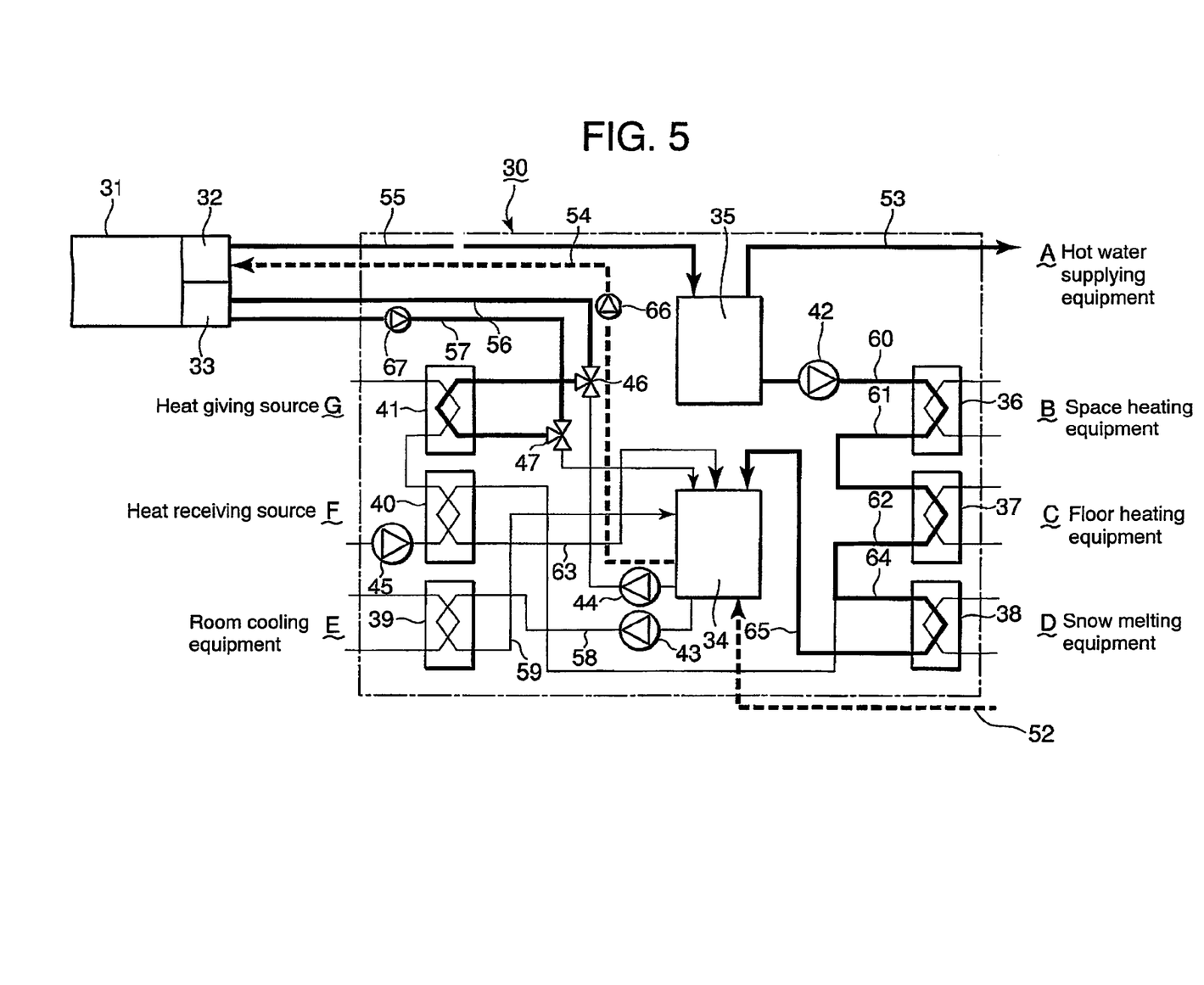
FIG. 5 is an overall system diagram of the second embodiment of the present invention in the case of hot water supplying, space heating, floor heating, and snow melting in winter.
Figure 6:
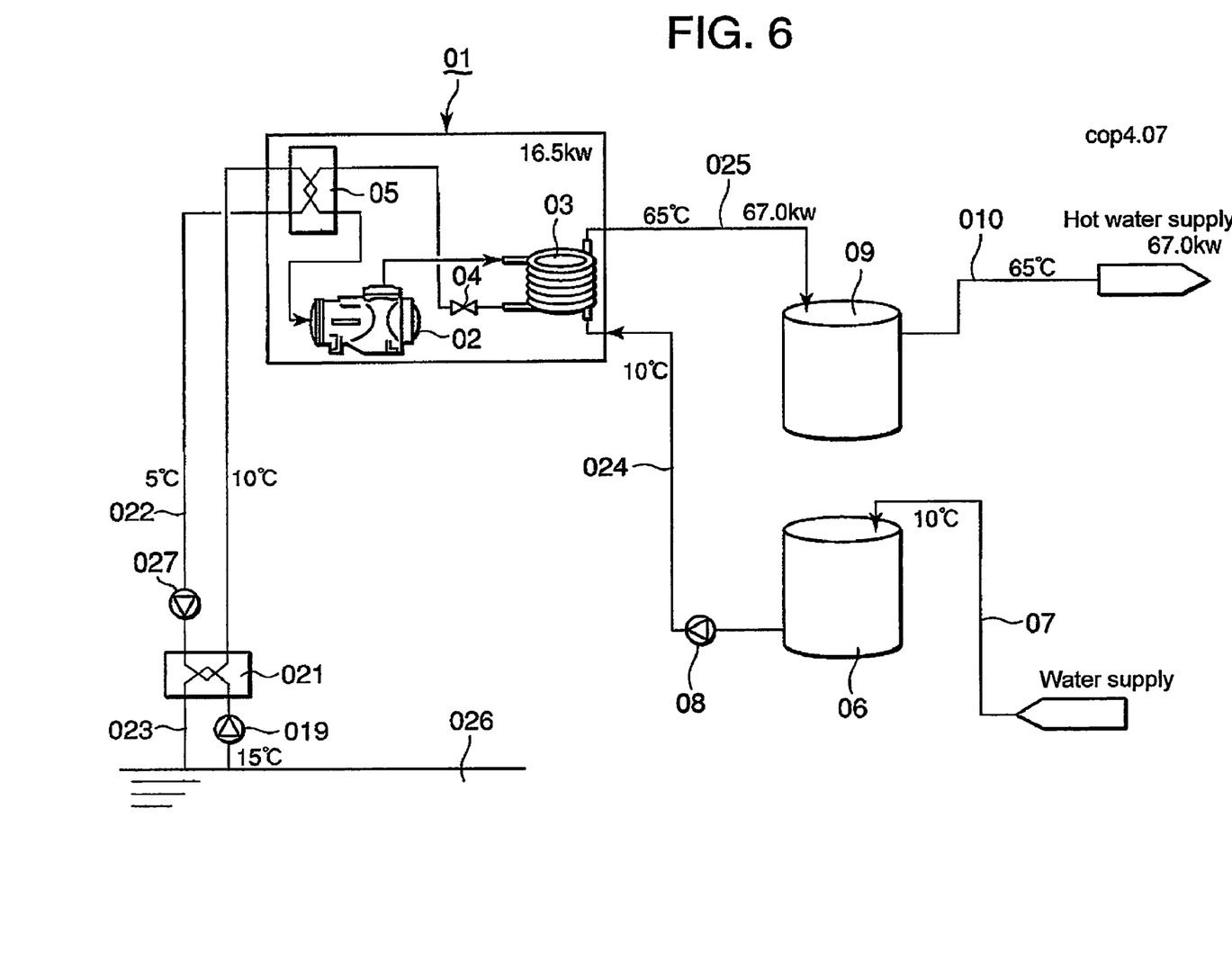
FIG. 6 is a basic system configuration (example 1 for comparison) considered in the process to arrive at the present invention.
Figure 7:
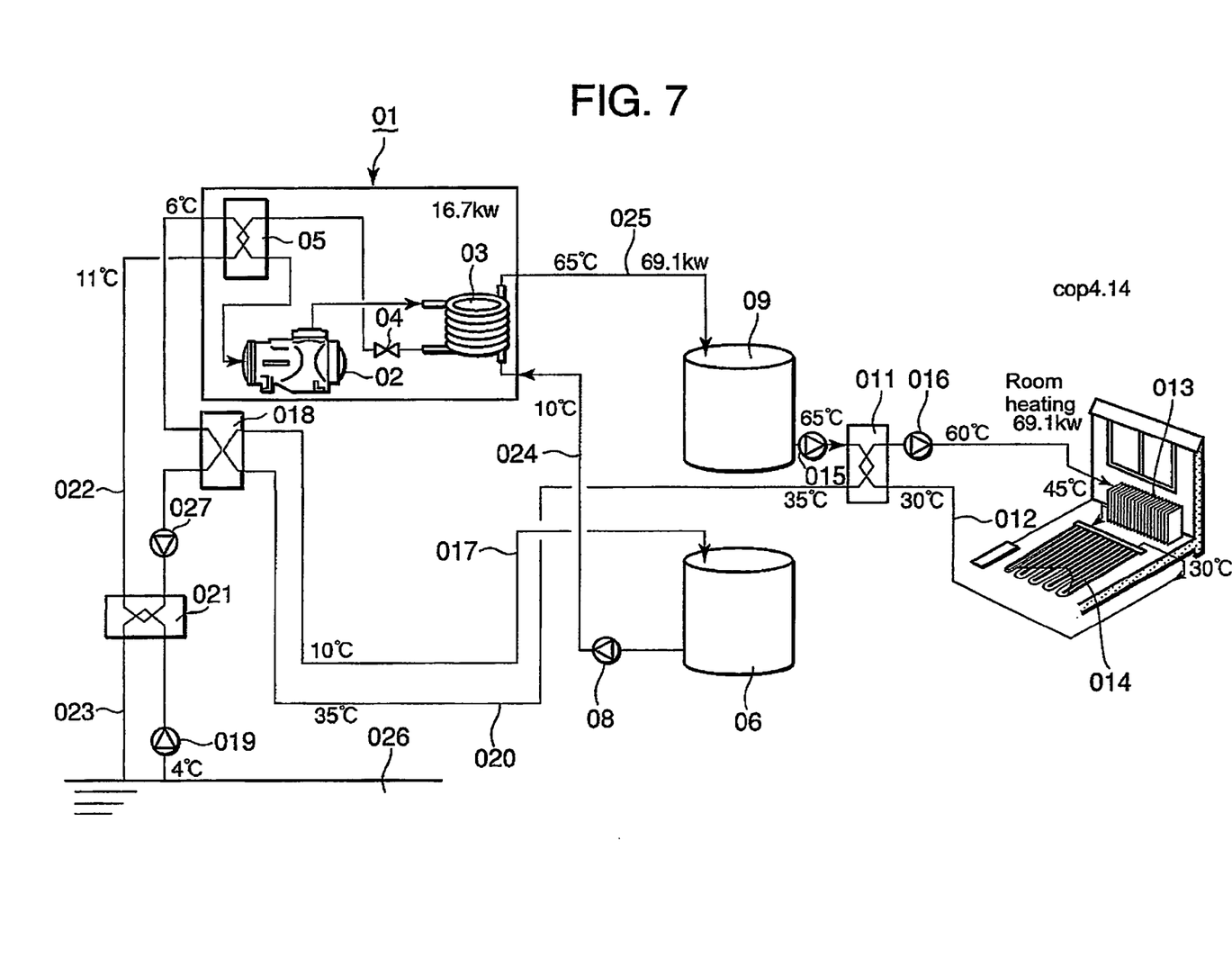
FIG. 7 is another basic system configuration (example 2 for comparison) considered in the process to arrive at the present invention.

FIG. 1 is an overall system diagram of the first embodiment of the invention, FIGS. 2-5 are overall system configuration of the second embodiment showing flow diagrams varying in accordance with operation modes, FIG. 6 is a basic system configuration (example 1 for comparison) considered in the process to arrive at the present invention, and FIG. 7 is another basic system configuration (example 2 for comparison) considered in the process to arrive at the present invention.

Example for Comparison

FIG. 6 is a basic system configuration (example 1 for comparison) considered in the process to arrive at the present invention, by which it is envisioned to supply a heat source to hot water supplying equipment by a $CO_2$ heat pump. In FIG. 6, reference numeral 01 is a heat pump using $CO_2$ refrigerant, including a compressor 02, a gas cooler 03, an expansion valve 04, and an evaporator 05. Reference numeral 06 is a low temperature water tank to which low temperature water (city water, for example) of 10° C. is supplied through a water supply line 07. The water stored in the tank 06 is supplied by means of a pump 08 to the gas cooler 03 through a pipe line 024, heated there to 65° C., and sent to a high temperature water tank 09 through a pipe line 025 to be stored therein.

The high temperature water of 65° C. is supplied to hot water supplying equipment (not shown in the drawing) through a pipe line 010. Reference numeral 026 indicates river water, sewage water, or waste water of temperature of 15° C. This river water, etc. 026 is introduced to a heat recovering heat exchanger 021, exchanges heat with brine (water) circulating in a circulation line 022 connecting the evaporator 05 of the heat pump 01 and the heat exchanger 021 for heating the brine. The river water, etc. 026 performed heating of the brine returns back to the river, sewage water tank, or wasted water tank, on the other hand, the brine circulating in the circulation line 022 is heated in the heat exchanger 021 from 5° C. to 10° C. and returns to the evaporator 05 to supply latent heat of vaporization for $CO_2$ refrigerant to be evaporated.

In this way, the heat of river water, etc. is used as a heat source for supplying heat to evaporate the refrigerant in the evaporator 05 of the $CO_2$ heat pump 1. Coefficient of performance (COP) of 4.07 is attained with this system. Although high coefficient of performance can be achieved with this system by supplying low temperature water of 10° C. to the gas cooler 03 and generating high temperature water of 65° C. in the gas cooler 03, the system is applicable only to supply hot water to hot water supplying equipment, thus its application is restricted.

Next, FIG. 7 is anther basic system configuration (example 2 for comparison) considered in the process to arrive at the present invention, by which it is envisioned to supply a heat source to an air conditioner for space heating in winter by a $CO_2$ heat pump. Comparing FIG. 7 with FIG. 6, it is understood that in the system of FIG. 7, the pipe line 010 of FIG. 1 for supplying high temperature water to hot water supplying equipment is eliminated, instead a heat source is supplied to a heat waster, or radiator 013 constituting a space heating equipment and a heating floor panel 014 constituting a floor heating equipment.

The high temperature water of 65° C. stored in the high temperature water tank 09 is sent to a water-water heat exchanger 011 by a pump 015. A brine circulation line 012 passes through the water-water heat exchanger 011, the brine (water) being circulated in the circulation line 012 by means of a pump 016 between the radiator 013 and the heating floor panel 014 connected in series with the radiator 013 downstream thereof, and the brine exchanges heat in the heat exchanger 011 with the high temperature water to be heated from 30° C. to 65° C. and introduced to the radiator 013 to heat indoor space. Then, the water decreased in temperature to 45° C. is introduced to the heating floor panel 014 embedded in the room floor to perform floor heating. The brine decreased in temperature to 30° C. after performing floor heating returns to the water-water heat exchanger 011.

The hot water decreased in temperature to 35° C. by heat exchange with the brine circulating in the circulation line 012 is too high in temperature to be returned to the low temperature water tank 06 as low temperature water, so it is introduced to a heat source water heat exchanger 018 through a pipe line 017. Said high temperature water of 35° C. is cooled to 10° C. by heat exchange with the brine circulating in the circulation line 022 in the heat source water heat exchanger 018 and returns to the low temperature water tank 06 through a pipe line 020.

The river water, etc. 026 thus heated by said water of 35° C. flowed out from the water-water heat exchanger 011 is introduced to the heat exchanger 021 to heat the brine circulating in the circulation line 022 connecting the evaporator 05, heat exchanger 021, and heat source water heat exchanger 018. The river water, etc. 026 after heating the brine returns back to the river, sewerage, etc., on the other hand, the brine circulating in the circulation line 022 is heated to be adjusted in temperature to 11° C. in the heat exchanger 021 and returns to the evaporator 05 to supply latent heat of vaporization of the $CO_2$ refrigerant to evaporate it.

Thus, the brine adjusted in heat quantity thereof in the heat exchanger 018 for heating heat source water and the heat exchanger 021 for recovering heat is used as a heat source for supplying latent heat of vaporization of the refrigerant to the refrigerant in the evaporator 05 of the $CO_2$ heat pump 1.

With the system of example 2 for comparison, high coefficient of performance can be achieved as can be with the system of example 1 for comparison, but this system of example 2 can be applied only for supplying heat for room heating.

The present invention was made on the basis of these basic system configurations and arrived at a system which can supply a heat source to hot water supplying equipment, air conditioning equipment, and others independently simultaneously or selectively. Examples of embodiment will be described hereunder.

Example 1 of Embodiment

FIG. 1 is a $CO_2$ heat pump system including a hot water equipment and a space heating equipment to supply a heat source to the equipments in winter.

In FIG. 1, reference numeral 1 is a $CO_2$ heat pump comprised of a compressor 2, a gas cooler 3, an expansion valve 4, and an evaporator 5, using $CO_2$ as a refrigerant. Reference numeral 6 is a low temperature water tank to which low temperature water (city water, for example) of 10° C. is supplied through a water supply line 7. The water stored in the tank 6 is supplied by means of a pump 8 to the gas cooler 3 through a pipe line 24, heated there to 65° C., and sent to a high temperature water tank 9 through a pipe line 25 to be stored therein.

The high temperature water of 65° C. stored in the high temperature water tank 9 is sent to hot water supplying equipment (not shown in the drawing) and at the same time sent by a pump 15 to a water-water heat exchanger 11. A brine circulation line 12 passes through the water-water heat exchanger 11, the brine (water) being circulated by means of a pump 16 in the circulation line 12 between a heat waster, or radiator 13 and the heating floor panel 14, and the brine exchanges heat in the heat exchanger 11 with the high temperature water to be heated from 30° C. to 60° C. and is introduced to the radiator 13 to heat indoor space. Then, the water decreased in temperature to 50° C. is introduced to the heating floor panel 14 embedded in the room floor to perform floor heating. The brine decreased in temperature to 30° C. after performing floor heating returns to the water-water heat exchanger 11.

The hot water decreased in temperature of 35° C. by heat exchange with the brine circulating in the circulation line 12 is too high in temperature to be returned to the low temperature water tank 6 as low temperature water, so it is introduced to a heat source water heat exchanger 18 through a pipe line 17. Said high temperature water of 35° C. is cooled to 10° C. by heat exchange with the brine circulating in the circulation line 22 in the heat source water heat exchanger 18 and returns to the low temperature water tank 6 through a pipe line 20.

On the other hand, the brine circulating in the circulation line 22 is heated in the heat exchanger 21 from 6° C. to 11° C. and returns to the evaporator 5 to be used as a heat source for evaporating the refrigerant.

In this way, low temperature water is maintained at 10° C., high temperature water is maintained at 65° C., and coefficient of performance of 4.14 can be maintained.

As mentioned above, according to the first embodiment, hot water of 65° C. heated in the gas cooler 3 can be supplied as a heat source for hot water supplying equipment and space heating equipment, the temperature of the water returned to the low temperature tank 6 can be fallen by heat exchange in the outside heating system or by heat exchange with waste water, etc. and reduction in coefficient of performance of the $CO_2$ heat pump 1 can be prevented.

Further, by providing the waste water heat exchanger 18 and heat recovering heat exchanger 21, the brine (water) circulating in the circulation line 22 passing through the evaporator 5 of the heat pump 1 is heated by the hot water fallen in temperature in the water-water heat exchanger 11, by this the heat source side temperature of the evaporator 5 is raised and coefficient of performance of the heat pump 1 is increased.

Example 2 of Embodiment

Next, the second embodiment of the system of the invention will be explained with reference to FIGS. 2 to 5. In the embodiment, a $CO_2$ heat pump 31 performs heat source supply by way of a secondary side system unit 30, through which supplying of hot water or cool water to equipment A-E such as hot water supplying, space heating, floor heating, snow melting, and space cooling equipment is performed, and also is performed heat exchange between the refrigerant and/or hot water returning from the heating equipment and a heat receiving source F (source to be heated) or heat giving source G (source from which heat is withdrawn).

In FIGS. 2-5, reference numeral 34 is a low temperature water tank to supply low temperature water to a gas cooler 32 of the heat pump 1, 35 is a high temperature water tank for storing high temperature water heated to 35° C. in the gas cooler 32.

Reference numerals 36-41 are heat exchangers for allowing heat exchange between the hot or cool water flowing in the system 30 and the brine (water) flowing in the equipment A-E, and heat source fluid G, F found outside the system. Reference numerals 42-45, 66, and 67 are pumps provided in the system 30 for each corresponding piping. Reference numeral 51 is a communicating tube connecting the low temperature tank 34 with the high temperature tank 35, the open/close valve 51a opens or closes the passage of the communication tube 51. The open/close vale 51a is opened when storing hot water by nighttime operation. Reference numeral 52 is a water supply line for supplying low temperature water to the low temperature water tank 34, 53 is a hot water supply line for supplying the hot water of 65° C. stored in the high temperature water tank 35 to the hot water supplying equipment A.

Figure 2:
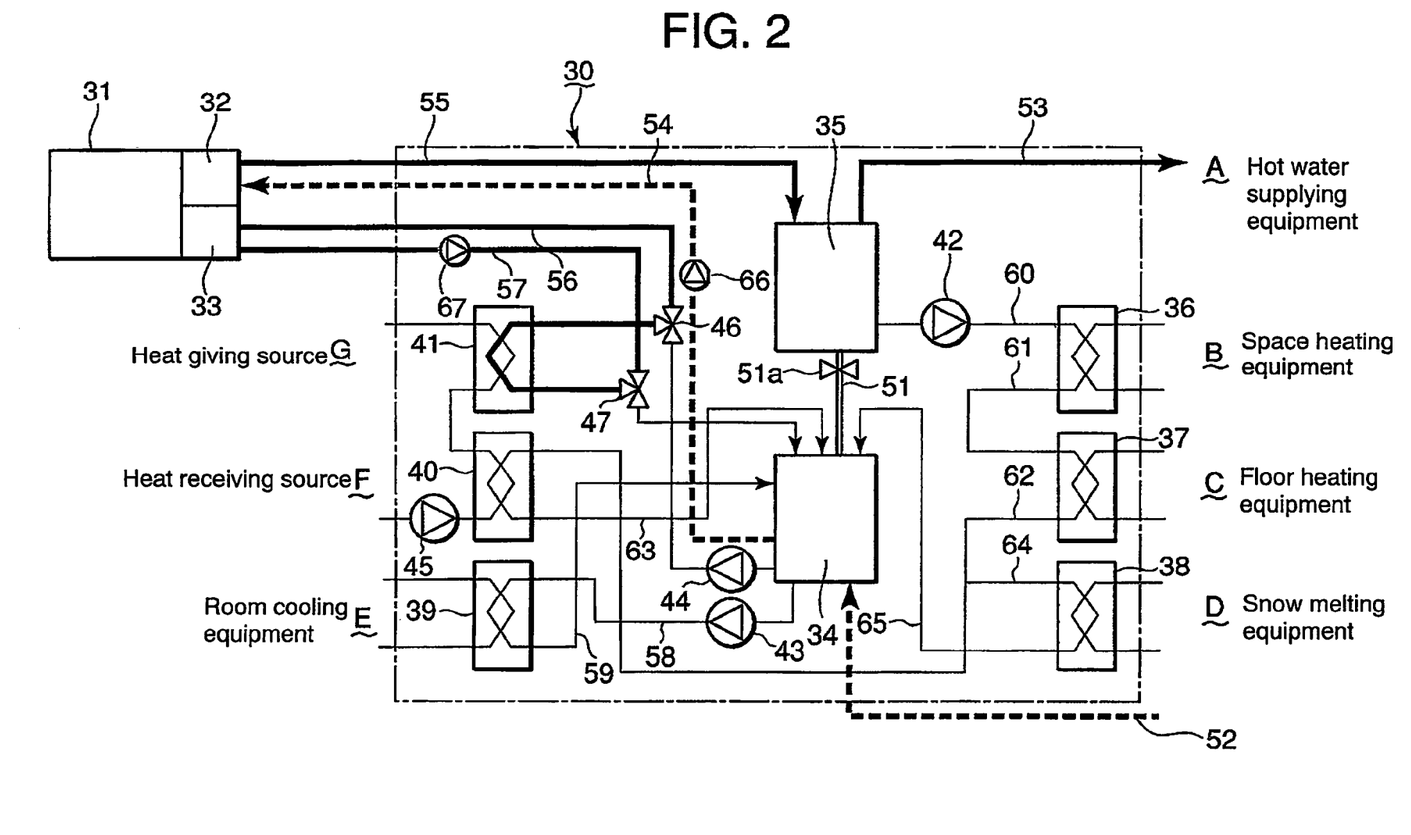
FIG. 2 is an overall system diagram of the second embodiment of the present invention in the case of hot water supplying year-around.

FIG. 2 shows the flow of water or brine when supplying hot water to hot water supplying equipment year-round. In FIG. 2, low temperature water of 10° C. is supplied to the gas cooler 32 of the $CO_2$ heat pump 31 from the low water tank 34 by means of a pump 66 through a pipe line 54, the water is heated in the gas cooler 32 to a temperature of 65° C. and this high temperature water is introduced into the high temperature water tank 35. The high temperature water is supplied to the hot water supplying equipment A through the pipe line 53.

On the other hand, brine (water) circulation is formed in pipe lines 56 and 57 connecting between a heat exchanger 41 and an evaporator 33 of the $CO_2$ heat pump 31 by switching three-way valves 46 and 47.

The heat receiving source F and heat giving source G correspond, for example, to river water, sewage water, waste water, etc. 26 of the first embodiment, and the heat exchanger 40 corresponds to the sewage water heat exchanger 18 and the heat exchanger 41 to the heat recovering heat exchanger 21. The brine (water) circulating in the circulation line formed between the evaporator 33 and heat exchanger 41 by the pipe lines 56 and 57 is heated in the heat exchanger 41, by this refrigerant passing through the evaporator 41 is supplied with heat to raise the heat source side temperature of the evaporator 33 and coefficient of performance of the heat pump 31 is increased.

When storing hot water by nighttime operation, the open/close valve 51a of the communicating tube 51 connecting the high temperature water tank 35 and low temperature water tank 34 is opened to form a circulation line to allow water to flow from the lower temperature water tank 35 through the gas cooler 33 and high temperature water tank 35 to return to the low temperature tank 34 so that high temperature water is stored not only in the high temperature water tank 35 but also in the low temperature water tank and the system is operated continuously in the night. By this, storage amount of hot water can be increased.

Figure 3:
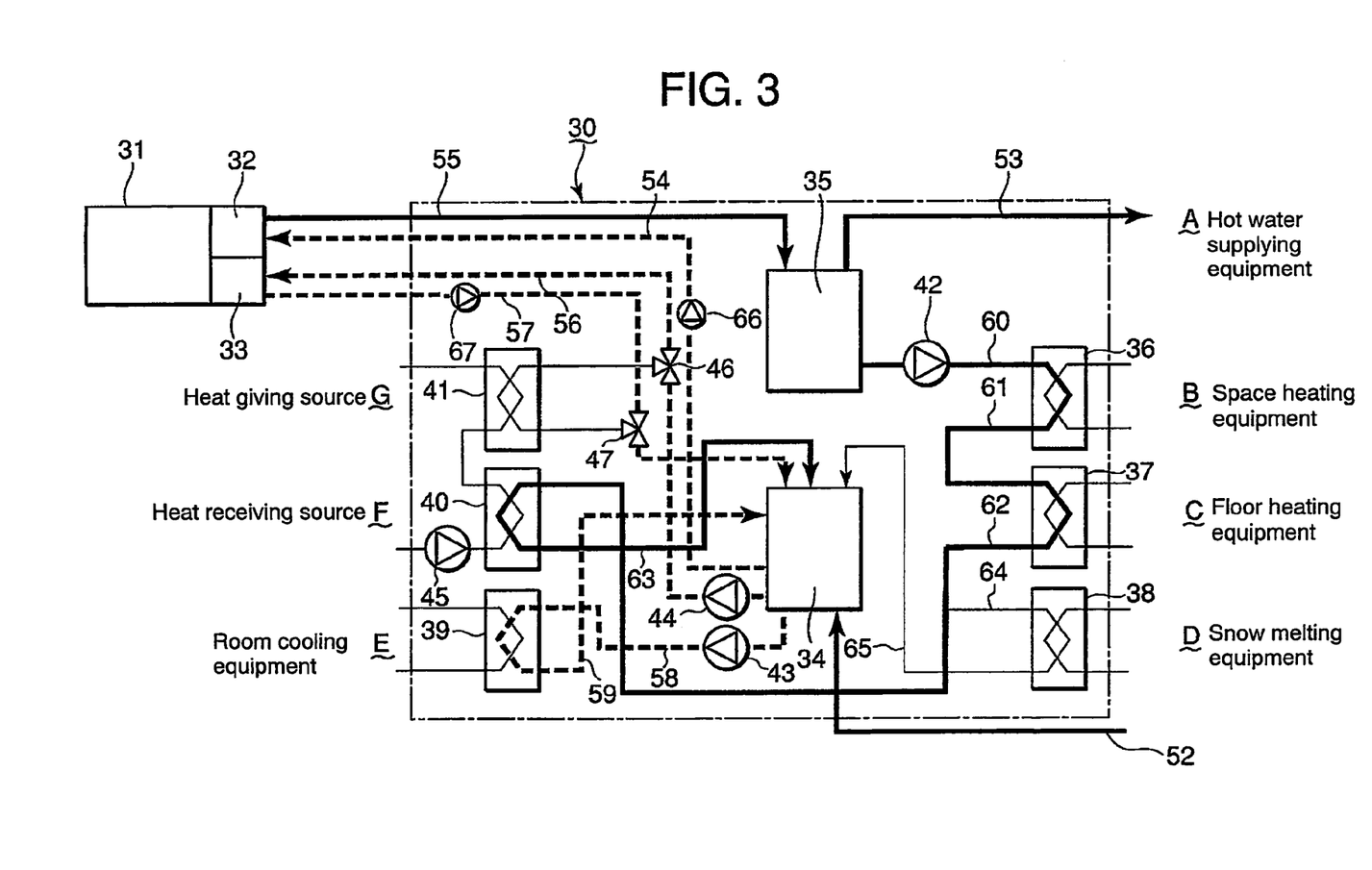
FIG. 3 is an overall system diagram of the second embodiment of the present invention in the case of hot water supplying and room cooling in summer.

Next, FIG. 3 shows the flow of water or brine when performing hot water supplying and space heating in summer. When supplying hot water, low temperature water of 10° C. is supplied from the low temperature tank 34 to the gas cooler 32 through the pipe line 54, the water is heated in the gas cooler 32 to high temperature of 65° C., this high temperature water is introduced to the high temperature water tank 35 through the pipe line 55 to be supplied to the hot water supplying equipment A through the pipe line 53 as a heat source. This is the same as is in the case of FIG. 2.

On the other hand, for space cooling, low temperature water is supplied to the evaporator 33 of the heat pump 31 by means of the pump 44 through the pipe line 56, the water is cooled in the evaporator 33 and returns to the low temperature water tank 34.

The cold water stored in the low temperature water tank 34 is supplied to a heat exchanger 39 by means of the pump 43 through a pipe line 56 and cools the brine of the space cooling equipment E, then returns to the low temperature water tank 34 through a pipe line 59.

When performing space cooling, it is necessary to dissipate heat unused for hot water supplying, and this is done by allowing high temperature water to flow through pipe lines used when supplying heat to the space heating equipment B and floor heating equipment C. That is, the hot water in the high temperature water tank 35 is introduced to the heat exchanger 40 through a pipe line 60, the heat exchanger 36, a pipe line 61, the heat exchanger 37, and a pipe line 62 by means of the pump 42. The hot water dissipates its heat to the heat receiving source F such as, for example, river water, sewage water, waste water, etc. to become low temperature water and returns to the low temperature water tank 34 through a pipe line 63.

Next, FIG. 4 shows the flow of water or brine when performing hot water supplying, space heating, and floor heating in winter. In FIG. 4, hot water supplying is done as is in the case of FIG. 2 and FIG. 3.

When performing space heating and floor heating, high temperature water is supplied from the high temperature water tank 35 to the heat exchanger 36 through the pipe line 60 by means of the pump 42 to heat the brine of the space heating equipment B. Then the water is introduced to the heat exchanger 37 through the pipe line 61 to supply heat to the heating medium of floor heating equipment C, and then introduced to the heat exchanger 40 through the pipe line 62.

The water introduced in the heat exchanger 40 and dissipates its heat there to a heat receiving source such as for example river water, sewage water, waste water, etc. to be cooled returns to the low temperature water tank 34. By arranging such that the hot water is first introduced to the heat exchanger 36 for the space cooling equipment B and then introduced to the heat exchanger 37 for the floor heating equipment C, the hot water first uses its heat for space heating to be reduced in temperature and then the water reduced in temperature uses its heat for floor heating, so hot water of a temperature appropriate for each of the space heating and floor heating respectively can be supplied. By introducing the water flowing out lastly from the heat exchanger 37 to the heat exchanger 40 to decrease its temperature below ordinary temperature and returning to the low temperature water tank 34, coefficient of performance of the heat pump is maintained high and high efficiency of the heat pump system is achieved.

Further, by forming a circulation line between the evaporator 33 and heat exchanger 41 by means of the pipe lines 56 and 57 and heating the brine circulating in the circulation line by means of pump 67 by the heat giving source G in the heat exchanger 41 so that the refrigerant passing through the evaporator is given heat by the brine as is in the case of FIG. 2, coefficient of performance of the heat pump 31 can be increased.

Next, FIG. 5 shows the flow of water or brine when performing hot water supplying, space heating, floor heating, and snow melting in winter. In FIG. 5, hot water supply is done as is in the case of FIG. 2 and FIG. 3. When performing space heating, floor heating, and snow melting, high temperature water is supplied from the high temperature tank 35 to heat exchanger 36 through the pipe line 60 by means of the pump 42 to supply heat to the brine of the space heating equipment B. Then the hot water is supplied sequentially to the heat exchanger 37 through the pipe line 61 and to the heat exchanger 38 through the pipe line 62 and 64 for supplying heat to the brine of the floor heating equipment B and the brine of the snow melting equipment D respectively.

The water flowing out from the heat exchanger 38 after supplying heat to the brine of the snow melting equipment D is introduced to the low temperature water tank 34. When performing all of hot water supplying, space and floor heating, and snow melting, withdrawing of heat is done only from the heat receiving source G.

By connecting the heat exchangers for the space heating, floor heating, and snow melting equipment B, C, and D respectively in series, the hot water dissipates heat sequentially in each heat exchanger, so hot water is introduced to each heat exchanger at appropriate temperatures, for example, at 65° C. at the entrance to the heat exchanger 36 for the space heating equipment B, at 50° C. at the entrance to the heat exchanger 37 for the floor heating equipment C, and at 30° C. at the entrance to the heat exchanger 38 for the floor heating equipment D.

As the water flowing out from the last heat exchanger 38 for the snow melting equipment D is fallen in temperature below ordinary temperature, there is no problem to introduce it directly to the lower temperature tank 34. In this way, the temperature of the hot water is decreased while utilizing the heat effectively and coefficient of performance of the heat pump is maintained at high value.

According to the second embodiment, by constituting a system consisting of a $CO_2$ heat pump 31 and a system unit 30 through which supplying of hot water or cool water to equipment of hot water supplying, space heating, floor heating, snow melting, and space cooling is performed, and also is performed heat exchange between the refrigerant and/or hot water returning from the heating equipment and a heat receiving source F (source to be heated) or heat giving source G (source from which heat is withdrawn), a heat pump system having all-round functions can be realized which performs hot water supplying and space cooling in summer and hot water supplying, space heating, and snow melting in winter.

By utilizing outside heat source or releasing heat to outside, the temperature of the water supplied to the condenser (gas cooler) of the heat pump is always kept low, and particularly in winter by raising heat source side temperature in the evaporator by using outside heat source and part of the heat obtained by the heat pump, coefficient of performance of the heat pump is increased and a highly efficient heat pump system can be realized.

In the second embodiment, it is possible that a plurality of high temperature water tanks 35 or a plurality of low temperature water tanks 34 are provided in correspondence with the amount of heat supply necessary for hot water supply and air conditioning and so on.

Further, the system of the invention can be applicable to the case the evaporator 33 is replaced by an air-to-refrigerant heat exchanger.

INDUSTRIAL APPLICABILITY

According to the system of the present invention, the inlet temperature of the cooling water to the gas cooler of the heat pump is maintained lower than a certain temperature and the heat source side temperature of the evaporator of the heat pump is increased so that not only supply of hot water but also supply of heating medium or cooling medium to air conditioning or other equipment can be performed efficiently and effectively.

The invention claimed is:

1. A hot water supply and air conditioning system using $CO_2$ heat pump cycle, the $CO_2$ heat pump cycle including a compressor which compresses the $CO_2$ to beyond a critical point, a gas cooler which exchanges heat with the $CO_2$ being beyond the critical point and heats water, a pressure reducing device which reduces a pressure of the $CO_2$ flowed out from the gas cooler, and an evaporator which cools the reduced $CO_2$, the compressor, the gas cooler, the pressure reducing device and the evaporator being connected in sequence for supplying a heat source to hot water supplying equipment and air conditioning equipment through independent pipe lines, the hot water supplying and air conditioning system comprising:
   a low temperature water tank for storing low temperature water of 25° C. or lower,
   a high temperature water tank for storing high temperature water of 60° C. or higher supplied from the low temperature water tank and heated in said gas cooler,
   two pipings for extracting the high temperature water, connected to an outlet of the high temperature water of said high temperature water tank separately from said gas cooler,
   hot water supplying equipment connected to one of the pipings for extracting the high temperature water to be supplied with the high temperature water,
   a first heat exchanger connected to the other of the pipings for extracting the high temperature water to be supplied with the high temperature water,
   room heating equipment as said air conditioning equipment connected to a heat-exchanged side of the first heat exchanger, to which a heat giving fluid heat-exchanged with the high temperature water is supplied,
   a piping for a middle temperature water cooled to the temperature of 60° C. or lower by heat exchange with heat receiving fluid through the first heat exchanger, the piping for the middle temperature water connecting an outlet of the first heat exchanger and an inlet of a second heat exchanger for the middle temperature water to introduce the middle temperature water into the second heat exchanger,
   cooling water supply equipment for producing cooling water by heat exchange of brine in a circulating line with city water such as river water, snowmelt water, sewage water or waste water,
   a middle temperature water cooling system for cooling the middle temperature water by introducing the cooling water from the cooling water supply equipment in the second heat exchanger, and
   a piping for introducing the low temperature water into the low temperature water tank, the low temperature water being heat-exchanged with cooling water in the second heat exchanger and cooled to the temperature of 25° C. or lower.

2. A hot water supply and air conditioning system according to claim 1, wherein said room heating equipment includes a space heating equipment, a piping for the heat giving fluid being heat-exchanged with the high temperature water is connected to the space heating equipment and then to the floor heating equipment in series, and a floor heating equipment, and said heat giving fluid flows through the space heating equipment and then the floor heating equipment sequentially.

3. A hot water supply and air conditioning system according to claim 1, further comprising cooling equipment provided for utilizing the low temperature water stored in low temperature tank as a cooling agent.

4. A hot water supply and air conditioning system according to claim 1, wherein said high temperature water tank and low temperature water tank are communicated with each other by a passage capable of being opened or closed, and both the tanks are communicated with each other by opening said passage when performing nighttime operation to store high temperature water so that the high temperature water is stored in both of said low temperature water tank and high temperature water tank.

5. A hot water supply and air conditioning system according to claim 1, further comprising snow melting equipment connected to said room heating equipment, said heat giving fluid flows through said room heating equipment and then said snow melting equipment sequentially.

6. A hot water supply and air conditioning system according to claim 1, wherein the middle temperature water cooling system is a cooling water circulating system, wherein after the middle temperature water is cooled by heat exchange with the cooling water introduced in the second heat exchanger from the cooling water supply equipment, the cooling water is introduced in the evaporator of the $CO_2$ heat pump cycle to cool the $CO_2$, and then the cooling water is heat-exchanged with the city water through the cooling water supply equipment.

* * * * *